United States Patent [19]

Michal et al.

[11] 4,214,901

[45] Jul. 29, 1980

[54] HYDROMETALLURGICAL REFINING OF NICKELIFEROUS SULFIDES

[75] Inventors: Eugene J. Michal, Golden; Simon O. Fekete, Arvada, both of Colo.; H. Jan Roorda, Ryswyk, Netherlands

[73] Assignee: Amax Inc., Greenwich, Conn.

[21] Appl. No.: 12,774

[22] Filed: Feb. 16, 1979

[51] Int. Cl.$^2$ .................. C22B 23/02; C22B 23/04; C22B 15/00

[52] U.S. Cl. ........................ 75/119; 75/82; 75/101 R; 75/101 BE; 75/117; 75/121; 423/139; 423/148; 423/153

[58] Field of Search ............ 75/119, 117, 101 R, 75/101 BE, 82; 423/139, 148, 153

[56] References Cited

U.S. PATENT DOCUMENTS

| | | | |
|---|---|---|---|
| 940,292 | 11/1909 | Wells | 75/119 X |
| 2,668,107 | 2/1954 | Gordon et al. | 75/82 X |
| 2,753,259 | 7/1956 | Schlecht et al. | 75/119 |
| 3,085,054 | 4/1963 | Thornhill | 75/119 X |
| 3,642,441 | 2/1972 | Van Weert | 423/481 |
| 3,754,891 | 8/1973 | Bryk et al. | 75/110 |
| 3,761,566 | 9/1973 | Michal | 75/119 X |
| 3,840,446 | 10/1974 | Gandon et al. | 75/119 X |
| 3,988,224 | 10/1976 | Barriere et al. | 423/100 X |
| 4,044,096 | 8/1977 | Queneau et al. | 423/142 X |
| 4,067,952 | 1/1978 | Pittie et al. | 75/119 X |
| 4,093,526 | 6/1978 | Blanco et al. | 75/119 X |
| 4,098,870 | 7/1978 | Fekete et al. | 423/142 X |
| 4,110,043 | 7/1978 | Chou et al. | 75/119 X |
| 4,110,400 | 8/1978 | Jha et al. | 423/141 |
| 4,135,918 | 1/1979 | Ettel et al. | 423/141 X |

Primary Examiner—G. Ozaki
Attorney, Agent, or Firm—Michael A. Ciomek

[57] ABSTRACT

Nickeliferous sulfidic materials containing at least one other metal selected from the group consisting of cobalt, copper and iron are leached with an at least 3 N hydrochloric acid solution to produce a pregnant nickel chloride solution. The pregnant nickel chloride solution is treated with a liquid organic extractant to extract the other metals. The nickel chloride raffinate is concentrated with respect to nickel chloride, and the concentrated nickel chloride solution is heated to at least about 750° C. to hydrolyze the nickel chloride to a refined nickel oxide product and a hydrogen chloride-containing gaseous effluent which is recycled to the concentration step and then through water to regenerate the leaching solution.

36 Claims, 4 Drawing Figures

FIG. 4

HYDROMETALLURGICAL REFINING OF NICKELIFEROUS SULFIDES

FIELD OF THE INVENTION

The present invention relates to hydrometallurgy and, more particularly, to the hydrometallurgical treatment of nickeliferous and cobaltiferous sulfides to recover separately the nickel and cobalt values.

BACKGROUND OF THE INVENTION

Wells in U.S. Pat. No. 940,292 discloses a process for treating nickel-copper mattes to recover nickel separately from the matte. This process involves leaching finely divided matte with hydrochloric acid solutions containing not more than about 25% hydrogen chloride to selectively dissolve the nickel values contained in the matte. Any copper dissolved is removed by fresh matte or by hydrogen sulfide which is a by-product of leaching. Nickel in a commercially acceptable form is recovered from the chloride solution by crystallization followed by hydrogen reduction or by precipitation of nickel ammine sulfate.

In U.S. Pat. No. 3,085,054 to Thornhill, there is disclosed a process for treating a nickel copper matte to recover metallic nickel and copper sulfide. The process involves the selective dissolution of the nickel values with a concentrated hydrochloric acid solution while leaving most of the copper values undissolved. After separation of the nickel chloride solution from the copper sulfide, the pregnant nickel chloride solution is oxidized with air or chlorine while adding further amounts of hydrogen chloride to oxidize ferrous iron to ferric iron and to form anionic chloride complexes of the various impurities. The thus treated pregnant solution is contacted with an anion exchange resin or a liquid extractant to extract those metals which form anionic chloride complexes. Additional amounts of hydrogen chloride are added to the purified nickel chloride solution to crystallize nickel chloride therefrom. Metallic nickel is recovered from the crystallized nickel chloride by electrolysis or by hydrogen reduction. When electrolysis is used to recover metallic nickel, gaseous chlorine is generated at the anode. In a separate operation, the gaseous chlorine is reacted with hydrogen and hydrogen sulfide generated during the dissolution of the matte to form hydrogen chloride which is recycled to both the dissolution and the nickel chloride crystallization steps. The liquor remaining after the nickel chloride crystallization step is treated to strip a portion of the hydrogen chloride therefrom and is then treated to remove lead. The lead-free liquor containing substantial amounts of nickel, e.g. more than 25 grams per liter, is heated and recycled to the matte leaching operation. When metallic nickel is recovered by hydrogen reduction the same general flowsheet is employed except that upon reduction of the nickel chloride with hydrogen a gaseous effluent containing hydrogen and hydrogen chloride is obtained which effluent must be treated to scrub the hydrogen chloride therefrom.

Although the process described by Thornhill is useful in producing a highly refined nickel product, there are certain inherent disadvantages. For example, as the process relies on the crystallization of nickel chloride for the ultimate recovery of nickel, it is necessary to recycle the mother liquor from which nickel chloride has been crystallized. Thus, substantial amounts of nickel are inventoried in the circulating mother liquor adding to the capital and operating costs. Another disadvantage of the process disclosed by Thornhill involves the recovery of metallic nickel. Whether metallic nickel is recovered by electrolysis or by hydrogen reduction, recovery of hydrogen chloride is complicated either by the fact that electrolysis generates gaseous chlorine which must be converted to hydrogen chloride, or in the reduction of nickel chloride with hydrogen both the hydrogen and hydrogen chloride must be recovered which entails not only an absorbing process for recovering hydrogen chloride but also a process for drying the hydrogen stream from which the hydrogen chloride has been absorbed. The conversion of gaseous chlorine to hydrogen chloride and the drying of the hydrogen stream from which hydrogen chloride has been removed entail additional capital and operating costs. Another disadvantage is the high cost of hydrogen.

Van Weert in U.S. Pat. No. 3,642,441 describes a process for hydrolyzing chlorides in fluidized beds and specifically refers to nickel chloride derived from the Thornhill process described above. Van Weert describes the hydrolysis of hydrated nickel chloride crystals, although he states that solutions can be similarly hydrolyzed. Although van Weert suggests his process may be capable of hydrolyzing metal chloride solutions, there is no suggestion that hydrochloric acid solution approaching its azeotropic composition and containing metal chlorides could be hydrolyzed by his process. Moreover, the van Weert process does not provide 100% hydrolysis of the metal chlorides and is silent on the recovery of the unconverted metal chlorides. Hydrolysis of nickel chloride crystals, besides presenting materials-handling problems, also presents control problems because the combustion of fuel must be carefully regulated to insure substantially complete combustion without generating an atmosphere containing such excesses of free oxygen which oxidize generated hydrogen chloride to gaseous chlorine which must be recovered with difficulty and with added cost. The presence of gaseous chlorine also creates severe corrosion problems.

SUMMARY OF THE INVENTION

The present invention relates generally to a process for recovering nickel from a sulfidic material containing at least one other metal selected from the group consisting of cobalt, copper and iron. The sulfidic material is leached with an at least 3 normal (N) hydrochloric acid solution to provide a pregnant nickel chloride solution. The pregnant nickel chloride solution is contacted with a liquid organic extractant to extract the other metal. Nickel chloride raffinate is first concentrated and is then fed to a high temperature hydrolysis unit where nickel chloride is oxidized to a substantially pure nickel oxide product and hydrogen chloride. The hot gaseous effluent from the hydrolysis unit is first passed through the nickel chloride raffinate to heat the solution and to evaporate water therefrom. After passing through the nickel chloride solution, the gaseous effluent is passed through a water absorber to generate hydrochloric acid for leaching fresh sulfidic material.

DETAILED DESCRIPTION OF THE INVENTION

The present invention involves a novel combination of steps for treating nickeliferous sulfidic materials containing at least one other metal selected from the group consisting of cobalt, copper and iron for the separate recovery of nickel and the other metal. The novel combination of steps includes leaching the sulfidic material with hydrochloric acid to form a pregnant nickel chloride solution, extracting the other metal from the nickel chloride solution with at least one liquid organic extractant, concentrating the raffinate from the liquid organic extraction step, and feeding the concentrated nickel chloride raffinate to a pyrohydrolysis step to oxidize the nickel chloride raffinate to a refined nickel oxide product and a hot gaseous effluent containing hydrogen chloride which is passed through the nickel chloride raffinate to concentrate the nickel and to recover heat from the hot gaseous effluent and the cooled gaseous effluent is then passed through a water absorber to generate a hydrochloric acid solution for leaching fresh nickeliferous sulfidic material.

The process in accordance with the present invention is advantageously used to refine nickel sulfide precipitates produced by precipitating nickel and cobalt contained in pregnant leach solutions derived by leaching oxidic ores with sulfuric acid. The combination of sulfuric acid leaching and chloride refining provides numerous advantages. Sulfuric acid leaching at elevated temperatures and sulfide precipitation provides an initial separation of nickel and cobalt from the bulk of the iron that is invariably present in nickeliferous oxide ores. Chloride refining separates nickel and cobalt and provides gaseous streams at various stages for recycling throughout the overall process. The combination of chemical extraction and chemical refining steps provides a highly integrated process which minimizes the consumption of the major reagents while producing a highly refined nickel-containing product and a highly refined cobalt-containing product.

Figure 1:
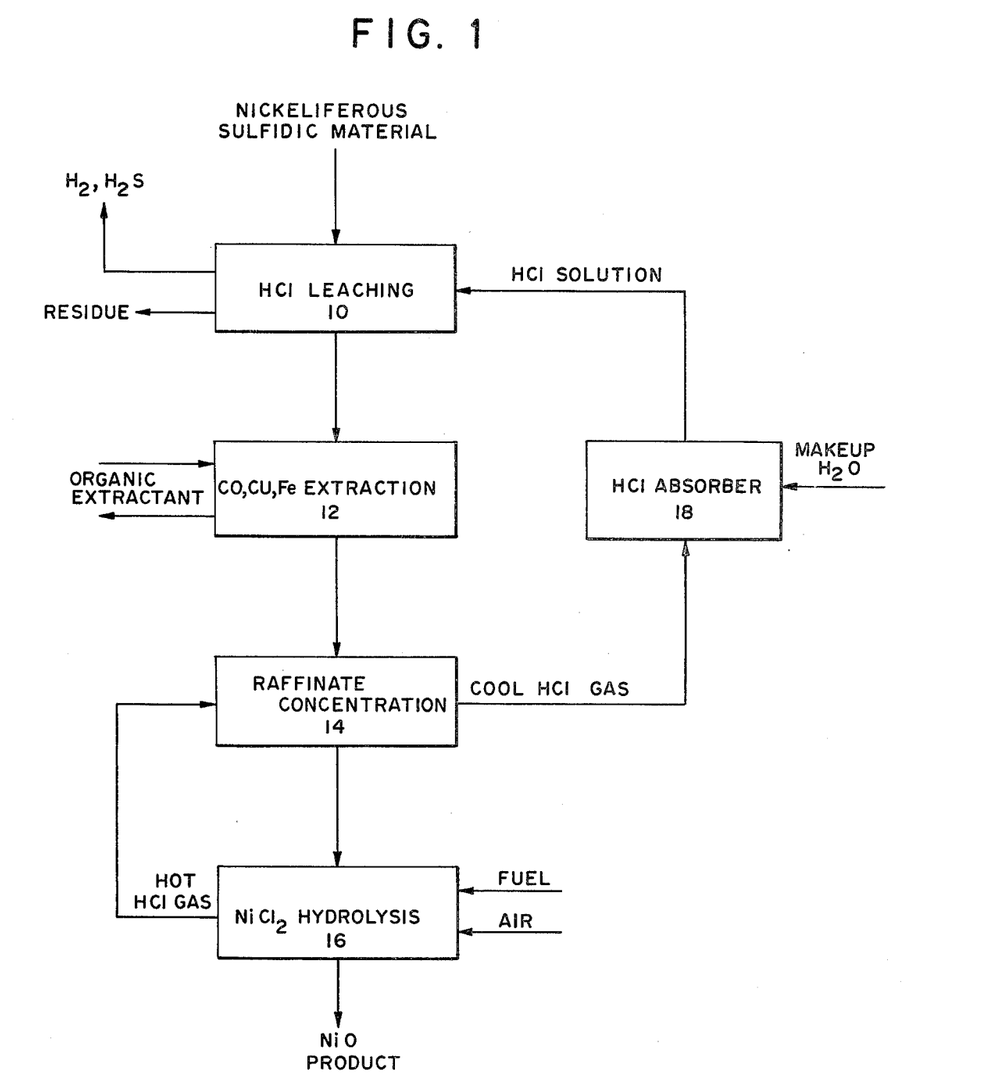
FIG. 1 is a flowsheet of the process in accordance with the present invention.

Referring to FIG. 1 there is depicted a flowsheet of the present process. Nickeliferous sulfidic material containing at least one other metal selected from the group consisting of cobalt, copper and iron is leached at stage 10 with hydrochloric acid to produce a pregnant nickel chloride solution which is treated for nickel recovery and a gaseous stream which is treated to recover hydrogen sulfide and any hydrogen generated during leaching. The pregnant solution is treated with an organic extractant in stage 12 to extract the other metal. The raffinate from stage 12 is concentrated at stage 14. The concentrated raffinate is fed to a bed of nickel oxide in a fuel-fired reactor at stage 16 to hydrolyze the nickel chloride to a marketable nickel oxide and a hot gaseous effluent containing hydrogen chloride which is passed through the raffinate in stage 14 to concentrate the raffinate and then through water at stage 18 to absorb hydrogen chloride to regenerate the leaching solution.

The process in accordance with the present invention can be used to refine nickeliferous sulfidic materials from any source. Thus, nickel sulfide concentrates, nickel mattes, nickel-copper mattes, nickel sulfide precipitates and any other nickeliferous sulfidic metallurgical intermediates can be treated to recover separately nickel and cobalt or copper. However, the sulfur content of the nickeliferous sulfidic material is advantageously lower than that required to satisfy the stoichiometry of nickel monosulfide.

Most nickeliferous materials can be leached without any pretreatment. However, the rate and the extent of dissolution of nickel sulfide precipitates can be significantly improved by activation. Nickeliferous sulfide precipitates can be activated in an number of ways. The sulfide precipitates can be smelted and granulated to a particle size of at least about 100% minus 60 Tyler Screen Size (TSS) or granulated and then ground to a particle size of at least about 100% minus 60 mesh, TSS. Activation can also be accomplished by heating the sulfidic material in a hydrogen atmosphere to lower the sulfur content. Activation by hydrogen reduction is advantageously conducted at temperatures between about 250° C. and about 700° C. and most advantageously between about 300° C. and 600° C. in a hydrogen atmosphere with the off-gases being treated to separate the hydrogen and the hydrogen sulfide which are both recycled to the process. When activating the sulfidic material by smelting or hydrogen reduction only a portion of the sulfidic material need be so activated. The portion that is thermally activated is selected so that the overall sulfur content of the entire feed is less than that required to satisfy the sulfur stoichiometry of all the metals present in the feed. Other means of activating the sulfidic material include the addition of acid soluble metals, such as cobalt, copper, iron and preferably, nickel to the aqueous leach, or by heat treating mixtures of finely ground sulfidic materials and metals, preferably nickel to provide an excess of metal atoms (Me) over the stoichiometric residue.

The nickeliferous sulfidic material, whether activated or not, is leached with a hydrochloric acid solution having a hydrochloric acid concentration from at least about 3 normal (N), advantageously the acid concentration is between about 3 N and about 9 N. Hydrochloric acid concentrations of at least about 3 N insure commercially attractive rates of dissolution and extraction and minimize the volume of liquor that must be handled. Hydrochloric acid concentrations above the azeotrope (about 6 N) provide high rates of dissolution and extraction but present problems in materials handling and require special techniques for regenerating such highly concentrated solutions. Advantageously, hydrochloric acid concentrations between about 4 N and about 6 N are employed to provide acceptable rates of dissolution and extraction while minimizing the problems associated with acid concentrations above the azeotrope. Any loss in the rate of dissolution attributed to the use of azeotropic or lower acid concentrations is regained by the ability to use higher leaching temperatures without resort to the use of pressure vessels. Another advantage of using acid concentrations between about 4 N and about 6 N is that the pregnant solution can be more effectively treated for removal of certain impurities, such as zinc and ferric iron. Substantially all the nickel and cobalt in the matte are dissolved producing a pregnant solution and a gaseous effluent containing by-products of hydrogen and hydrogen sulfide.

Leaching is terminated before the free hydrogen chloride concentration of the leach liquor falls to below about 1 N, advantageously leaching is terminated at acid concentrations between about 1 N and about 3 N. Although leaching can be continued until more acid is consumed, at acid concentrations below about 1 N the rate of leaching slows down to commercially unattractive rates. The pregnant solution derived from leaching sulfide precipitates from laterite leach solutions usually contains between about 50 grams per liter (gpl) and about 300 gpl nickel, cobalt in amounts between about 1 gpl and about 50 gpl, small amounts of copper and having a free hydrochloric acid concentration between about 1 N and 3 N.

Hydrochloric acid leaching of the nickeliferous sulfide material can be conducted at ambient or elevated temperatures. However, it is preferred to leach at temperatures between about 50° C. and about 110° C. Although leaching can be conducted at ambient temperatures, lower rates of dissolution and lower nickel concentrations in the pregnant solution are encountered. Higher temperatures increase the rate of dissolution and the extent of the leaching reactions and nickel concentrations in the pregnant solutions but at temperatures in excess of the boiling temperature the incremental costs involved for autoclaves outweigh any benefits so gained. The process for leaching the nickeliferous sulfidic materials with hydrochloric acid is described in greater detail in U.S. Patent Application Ser. No. 12,781 filed on even date herewith in the name of Gustavo A. Meyer and entitled "Dissolution of Nickeliferous Sulfide Material" which is incorporated herein by reference.

Leaching is advantageously conducted in closed stirred vessels. Agitation insures good liquid-solid contact and thus increases the rate and extent of leaching. The leaching vessel is advantageously closed to avoid oxidation of the hydrogen sulfide evolved during the dissolution of the sulfidic material and to allow the recovery thereof for recycling.

When leaching nickel-copper mattes, leaching is conducted to maximize dissolution of nickel. Small amounts of copper will inevitably be dissolved. Most of the dissolved copper can be removed from the pregnant solution by treatment with fresh matte to cement the copper. Alternatively, the pregnant solution can be treated with hydrogen sulfide generated during the earlier leaching stages to precipitate copper sulfide.

After leaching is completed, the pregnant solution is passed through a filter or other liquid-solid separator to remove any undissolved solids. The undissolved solids, depending upon their nature, can be recycled for retreatment or sent to waste. The pregnant solution is then stripped of its hydrogen and/or hydrogen sulfide by passage through a stripping tower in which the pregnant solution is heated with steam to expel dissolved gases. Stripping hydrogen and hydrogen sulfide with steam is an advantageous feature of the present invention. Stripping with steam minimizes oxidation of the dissolved hydrogen and hydrogen sulfide thereby making possible their recovery in useful form. The stripped gases and the gases evolved during leaching are combined for purification and recycling, as described hereinafter.

After the stripping hydrogen and hydrogen sulfide from the pregnant nickel chloride solution the stripped solution can be treated with one or more liquid organic extractants to extract metals such as cobalt, copper, iron and zinc from the chloride solution. Advantageously, the pregnant nickel chloride solution is first contacted with tributylphosphate dissolved in an organic solvent to extract ferric iron, zinc and copper and the raffinate from this first extraction is then contacted with a water-insoluble amine dissolved in a water-immiscible organic solvent to extract cobalt. The pregnant nickel chloride solution will generally contain copper ions and ferrous and ferric iron in which case the pregnant solution is first contacted with a tributylphosphate solution to extract the copper, ferric iron and any zinc; and then the unextracted ferrous iron is oxidized to ferric iron by bubbling air or chlorine through the solution from which ferric iron is then extracted with a second tributylphosphate solution. Alternatively, as described hereinafter, the chloride concentration of the pregnant solution can be increased and the other metals can be extracted by various organic extractants. Cobalt, copper, iron, and zinc can be extracted from the pregnant solution by a variety of organic extractants. For example, cobalt chloride complexes can be extracted by higher alcohols, such as capryl alcohol, or by other suitable solvents. Complexed cobalt values can also be extracted from the pregnant solution with an organic extractant of water-insoluble amines, quarternary ammonium compounds, or organo-phosphorus compounds dissolved in a water-immiscible organic solvent.

Examples of suitable amines include x-heptalamines, x-dodecylamines, didodecylamine, tri-x-propylamine, tri-x-butylamines, tri(2-ethylhexyl) amine, triisooctylamine, tertiary amines which are derivatives of styrene oxide such as di(2-hydroxy-2-phenylethyl) ethylamine and tertiary amines which are polyglycolamines, such as tripropyleneglycolamine. The use of x hereinabove as in the term "x-heptyl-amines" is intended to refer to any structural isomers, as 1-n-heptylamine, 2-n-heptylamine, etc.

Two classes of quarternary ammonium compounds are found particularly advantageous for complexed metal extraction. These are Aliquat 336 reagent, hereinafter referred to as Aliquat chloride, a monomethyl quarternary ammonium chloride in which the alkyl chains each contain eight to ten carbon atoms, supplied by General Mills, Inc., and Arquad 2C reagent, hereinafter referred to as Arquad chloride, a dialkyl dimethyl ammonium in which the two alkyl groups each have a carbon chain length varying from eight to eighteen and averaging about twelve supplied by the Armour Industrial Chemical Company. However, other classes of water-insoluble quarternary ammonium compounds or their chlorides may be utilized.

When amines or quarternary ammonium compounds are used to extract cobalt or other metals, the amines or quarternary ammonium compounds are initially treated with hydrochloric acid to form the hydrogen chloride salts thereof. This acidification treatment has at least two benefits. Initial acidification minimizes loss of acid from the leach solution and the hydrogen chloride salts in the extractant promote the formation of the chloride complexes that are extracted by the amines or quarternary ammonium compounds.

The organo-phosphorus compounds that can be used are exemplified by alkyl-substituted phosphorus acids, alkyl substituted phosphates and alkyl-substituted phosphine oxides. Examples of generic groups include heptadecyl phosphoric acid, tributylphosphate and tri-n-octyl phosphine oxide.

The amines, quarternary ammonium compounds or organo-phosphorus compounds are advantageously dissolved in water-immiscible non-polar solvents. Suitable solvents include kerosene, naphtha, gasoline, xylene, methyl isobutyl ketone, water-insoluble alcohols and mixtures of aromatic hydrocarbon solvents. The concentration of the amines, quarternary ammonium compounds, or their chloride salts in the organic solvent can vary from about 5% to about 50%, by volume, and advantageously between about 10% and about 20%.

A particularly advantageous embodiment of the present invention is the use of tributylphosphate, heptadecyl phosphoric acid and tri-n-octyl phosphine oxide dissolved in a water-immiscible organic solvent to extract the metal values commonly associated with nickeliferous oxide ores. The use of tributylphosphate is particularly useful when the ore contains small but significant amounts of zinc, which is quite deleterious to the final nickel product when the nickel is used as an alloying constituent for stainless steels or high temperature alloys. The reasons for using an organic extractant containing tributylphosphate when zinc is present is that zinc forms highly stable complexes with most other organic extractants and is very difficult to strip therefrom. In fact, zinc forms such stable complexes with most other extractants that the extractants become so loaded with zinc that the extractant loses its capacity for extracting other metals and must ultimately be replaced with fresh extractant.

When treating nickel chloride solution containing zinc, it has been found advantageous to extract the zinc when the chloride concentration of the nickel solution is between about 5 N and 7 N (approximately the chloride concentration of the pregnant leach liquor) with an organic extractant containing between about 15% and about 70%, by weight, tributylphosphate dissolved in a water-immiscible organic solvent. Any ferric iron present in the aqueous phase will also be removed at this stage.

After removing zinc, copper and any ferric iron from the nickel chloride solution, the nickel chloride solution can then be treated for cobalt extraction. Cobalt can be extracted without significantly increasing the chloride concentration with one or more of the amines described hereinbefore. Cobalt can also be extracted from the nickel chloride solution, after chloride adjustment, with an organic extractant of between about 15% and about 70% tributylphosphate dissolved in a water-immiscible organic solvent. The chloride concentration of the nickel chloride solution can be adjusted by quenching the off-gases from the high temperature hydrolysis unit or by sparging the chloride solution with concentrated hydrogen chloride vapors produced as described hereinafter. A method of purifying the pregnant nickel chloride solution is described in greater detail in U.S. Patent Application, Ser. No. 12,782, filed on even date herewith in the name of Gustavo A. Meyer and entitled "Purification of Nickel Chloride Solutions", which is incorporated herein by reference.

Cobalt, copper, iron and zinc can all be extracted from the pregnant nickel chloride solution with tributylphosphate by increasing the chloride concentration of the pregnant solution and the concentration of tributylphosphate in the organic extractant. The chloride and nickel concentrations of the stripped pregnant solution can be increased by evaporating water therefrom and by passing hydrogen chloride therethrough. This operation can be accomplished by using the stripped pregnant solution to quench the gaseous effluent from the pyrohydrolysis unit. Alternatively, the chloride concentration of the stripped solution can be increased by passing concentrated hydrogen chloride therethrough. Sufficient water is evaporated from the stripped pregnant solution to increase the nickel content to between about 150 gpl to about 300 gpl while at the same time the chloride concentration is increased to between about 7 N and about 11 N.

Concentration of the chloride contents in the pregnant solution by using the pregnant solution to cool gaseous effluent from high temperature hydrolysis has numerous advantages. Use of the hot gaseous effluent from the high temperature hydrolysis unit recovers a substantial portion of the sensible heat thereby lowering the overall energy requirements. Another important advantage is that by increasing the chloride concentration in the stripped pregnant solution the efficiency of the organic extraction process in extracting metal values, such as cobalt, can be increased significantly. Although use of the nickel chloride solution to quench the gaseous effluent from the pyrohydrolysis step prior to purification has advantages, one disadvantage is that some nickel oxide may be suspended in the gaseous effluent and the suspended nickel oxide may interfere with the organic extraction processes. This problem can be avoided by using purified nickel chloride solution to quench the effluent from pyrohydrolysis and to generate a gas stream having high hydrogen chloride concentrations for use in the chloride adjustment step and for other purposes. Any suspended nickel oxide in the gaseous effluent becomes suspended in the purified nickel chloride solution which in turn is fed to the pyrohydrolysis unit where the suspended nickel oxide presents no problem.

As organic extraction processes are based on mass action principles, the higher concentrations of most metal values in the pregnant solution allow smaller quantities of organic extractants to remove the same quantity of metal values as contained in more dilute solutions. The combination of high nickel and chloride concentrations has the further advantage of providing high chloride concentrations, which promote the formation of chloride anionic complexes of cobalt and of other metal values such as iron and copper without resorting to unduly high hydrogen chloride concentrations which can have adverse effects on the stripping of the metal values in the organic extractant.

The chloride anionic complexes are removed from the pregnant solution with an organic extractant in one or more stages using one or more organic extractants. The organic extractant can be in the form of a water-insoluble ion exchange resin or in the form of a water-immiscible organic liquid that has a greater dissolving potential for the chloride anionic complexes or has dissolved therein an organic anion exchange constituent.

Extractant of the cobalt, copper, iron and zinc is achieved by employing countercurrent principles in a series of reactors in which nearly exhausted extractant contacts fresh pregnant solution. The loaded extractant is stripped of the complexed metals which regenerates the extractant for use in recovering additional amounts of the complexed metals. The raffinate, purified nickel chloride solution, is then sent to a hydrolysis unit to recover refined nickel oxide and hydrogen chloride.

Hydrolysis of the purified nickel chloride solution is conducted in a direct-fired reactor. Pyrohydrolysis can be conducted in any type reactor that provides good liquid-gas contact between the nickel chloride solution and the products of combustion. Thus, pyrohydrolysis of the nickel chloride solution can be effected in a suspension type furnace or in a fluid bed reactor. The fluidized bed consists substantially of nickel oxide heated to a temperature above about 750° C., advantageously between about 800° C. and about 950° C. The particulate nickel oxide is maintained in the fluidized state and at temperatures by introducing fuel, advantageously a liquid or gaseous hydrocarbon, and air directly into the fluidized bed. The ratio of fuel to air is such that the products of combustion are nonreducing to nickel oxide and nickel chloride and nonoxidizing to hydrogen chloride. When hydrolyzing nickel chloride solution within the foregoing temperature range, the oxidizing nature of the atmosphere within the fluidized bed can be controlled by adjusting the air to fuel ratio to provide substantially complete combustion of the fuel while maintaining the free oxygen content of the off-gas at less than about 2%, by volume, e.g. preferably less than about 1%. Nickel chlorideis fed to the fluidized bed where the nickel chloride reacts with water to form nickel oxide and hydrogen chloride. Refined nickel oxide is withdrawn from the bed at a molar rate substantially equivalent to the rate at which nickel chloride is introduced into the bed. The gaseous effluent is treated to recover hydrogen chloride and heat.

The gaseous effluent from the fluid bed is first passed through a cyclone separator to remove most of the suspended nickel oxide, which is returned to the fluid bed reactor, and a substantially solids-free gaseous effluent. The gaseous effluent is treated to recover its sensible heat and hydrogen chloride. The gaseous effluent can be passed through a quench tower which uses the stripped pregnant solution as the coolant and then through an adiabatic absorber to provide an azeotropic solution of hydrogen chloride, a portion of which can be recycled to the leaching step. From the foregoing, it is apparent that the chloride refining process is closed with respect to hydrogen chloride except for the chlorides that accompany the impurities during the stripping of the organic extractant. Even the chloride removed by the stripping operation can be recovered by hydrolyzing the stripped values, e.g. cobalt.

In another embodiment of the present invention, purified nickel chloride solution is employed to quench the gaseous effluent from the pyrohydrolysis to recover sensible heat from the gaseous effluent, to concentrate the nickel chloride solution and to recover any suspended nickel oxide. The embodiment is advantageously employed when the pregnant nickel chloride solution is purified by one or more treatments with tributylphosphate to extract copper, iron and zinc and by treatment with an amine or a quarternary ammonium compound to extract cobalt, beacuse this purification scheme does not require high chloride concentrations for effective extraction of cobalt, copper, iron and zinc.

When a series of tributylphosphate treatments are used to extract cobalt as well as all of the other metals, purified nickel chloride solution is used to quench the gaseous effluent from the pyrohydrolysis unit to produce a concentrated nickel chloride solution which is split into two portions. A portion of the concentrated nickel chloride solution is fed to the pyrohydrolysis unit. A second portion of the concentrated nickel chloride solution is fed to a tower to generate concentrated hydrogen chloride gases. The cooled gaseous effluent from the quench tower is sent to a adiabatic absorber to recover the residual hydrogen chloride vapors to produce a hydrochloric acid solution approaching the azeotropic composition. A portion of the azeotrope is fed to the leaching step to dissolve further amounts of nickel sulfide. Another portion of the azeotrope from the adiabatic absorber is fed to a heat exchanger to form an azeotropic vapor phase which is fed to the same tower to which the concentrated solution from the quench tower is fed. As the azeotropic vapor phase passes through the column the water content thereof is absorbed by the concentrated nickel chloride solution thereby producing a gas having a high hydrogen chloride concentration which can be utilized for adjusting the chloride concentration of the stripped pregnant solution to facilitate recovery of metal values by organic extraction. A portion of the gas phase having high hydrogen chloride concentrations can also be used to adjust the acid concentration of the leach liquor. The concentrated nickel chloride solution now diluted with water from the azeotropic gas is fed to the column and is recycled to the quench tower. In order to provide gas streams having sufficiently high hydrogen chloride concentrations for adjusting the chloride concentration of the stripped pregnant nickel chloride solution, the concentrated nickel chloride solution from the quench tower should have a nickel concentration between about 250 gpl and about 330 gpl nickel, advantageously between about 300 gpl and about 330 gpl nickel.

An advantageous embodiment of the present invention is the use of the process in conjunction with an acid leaching process for recovering nickel and cobalt from oxidic ores. Cobalt is present in most oxidic ores (even in sea nodules) in far higher quantities than in sulfidic ores so that the nickel to cobalt ratio is about 30:1 or less. These comparatively low nickel to cobalt ratios present problems in the separation of the two metals. Pyrometallurgical and electrolytic processes generally used in commercial practice are economical in separating cobalt from nickel but as the nickel to cobalt ratio approaches 10:1 the costs of cobalt separation per unit of nickel produced become excessive. However, the process in accordance with the present invention provides an economically attractive alternative for treating intermediate products of these ores to recover separately the nickel and cobalt values.

Figure 2:
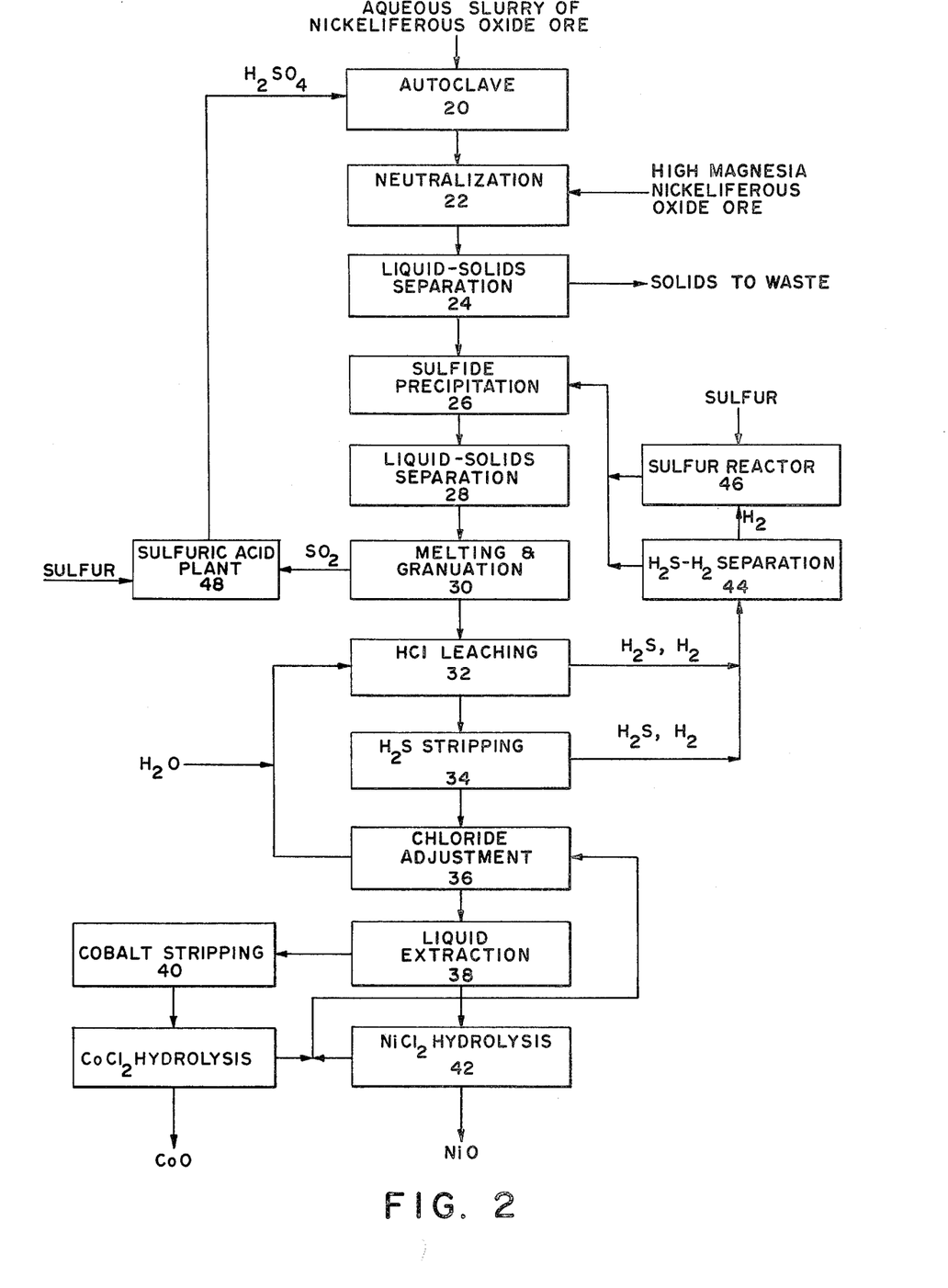
FIG. 2 is an overall flowsheet depicting the use of the present invention in conjunction with an acid leaching process for recovering nickel and cobalt from oxidic ores.

Referring now to FIG. 2 there is depicted a flowsheet illustrating the advantageous embodiment of acid leaching nickeliferous oxide ores and treating precipitates obtained from the leach solution by the process of the present invention. An aqueous slurry of nickeliferous oxide ore is fed to autoclave 20 to which sulfuric acid in amounts sufficient to react with the acid soluble constituents is added. The acidified slurry is heated to a temperature between about 230° C. and about 300° C. to dissolve the nickel and cobalt values. Advantageously, this leaching operation is conducted on a continuous basis.

The pregnant solution, after discharge from the autoclave, is neutralized in step 22. Neutralization of the pregnant solution is required to facilitate subsequent sulfide precipitation. In order to minimize reagent costs and to improve overall recovery the pregnant solution is neutralized with fresh ore, particularly ore having comparatively high concentrations of basic constituents, such as magnesia. Neutralization with ore is preferred as any nickel or cobalt contained in the ore will dissolve and report in the pregnant solution, but other common neutralizers can be used. The neutralization slurry is then subjected to a liquid-solid separation treatment at stage 24. The separated solids are sent to waste and the pregnant solution is treated for ultimate nickel and cobalt recovery.

Nickel and cobalt are precipitated from the neutralized pregnant solution as sulfide at sulfide precipitation stage 26. The actual precipitation conditions form no part of the present invention but the conditions are selected to provide a readily filterable and easily handled precipitate. Hydrogen sulfide is advantageously used to precipitate the nickel and cobalt values. The nickel and cobalt sulfides are separated from the barren solution in liquid-solids separation stage 28.

The sulfides of nickel and cobalt precipitated as described above are not chemically reactive and dissolve slowly, if at all, in hydrochloric acid. Therefore, the sulfide precipitate can be melted and granulated at stage 30 to activate the metal values for the hydrochloric acid leaching operation. When nickel sulfide is heated to elevated temperatures, a portion of the sulfur is vaporized and the composition of the nickel sulfide approaches $Ni_3S_2$. Continued heating melts the sulfide which is then granulated. Such heating and melting can be conducted in an electric arc furnace which minimizes gas flows and therefore eases the problems associated with sulfur recovery. The sulfide precipitate can also be flash smelted with extraneous fuel requirements being met with elemental sulfur in order to produce off-gases rich in sulfur dioxide (e.g. 8% or more) which off-gases can be readily converted to sulfuric acid for recycle for leaching the oxide ore. Processes for flash smelting are adequately described in U.S. Pat. Nos. 3,754,891 and 2,668,107 which are incorporated herein by reference. Smelting is controlled to produce a nickel matte containing not less than about 20% sulfur and not more than about 33% sulfur. Although sulfur deficient mattes, particularly those having sulfur contents below about 20%, are highly reactive and dissolve very readily in hydrochloric acid solutions, such mattes react with the hydrochloric acid to generate increasing amounts of hydrogen and decreasing amounts of hydrogen sulfide as the sulfur content of the matte decreases. Hydrogen sulfide is a useful reagent in the process and can be costly to prepare, and the presence of such large quantites of hydrogen in an industrial setting can be hazardous. By controlling the sulfur content to between about 25% and about 27% during smelting, a reactive matte product is obtained while at the same time the amount of hydrogen sulfide generated for recycle is maximized.

The granulated sulfides are then leached with hydrochloric acid at stage 32, as described hereinbefore. Hydrochloric acid leaching of the granulated sulfides produces a pregnant solution containing between about 50 gpl and about 300 gpl nickel and a gaseous effluent containing hydrogen and hydrogen sulfide. The pregnant chloride solution is then stripped of any dissolved hydrogen sulfide at stage 34. Stripping is accomplished by heating and passing a gas, such as steam, air or nitrogen, through the pregnant solution.

The nickel concentration of the stripped pregnant solution is adjusted to between about 150 gpl and about 300 gpl by evaporation in stage 36 during which treatment the chloride concentration also increases forming anionic chloride complexes of cobalt, iron and other metal impurities. The nickel concentration is adjusted by passing the hot effluent from high temperature hydrolysis through the stripped pregnant solution.

The complexed metal values are extracted from the concentrated solution at stage 38, which may include two or more sequential steps using different extractants. For example, complexed iron can be extracted with tributylphosphate dissolved in a suitable organic solvent. Thereafter, the other complexed metals can be extracted with water-insoluble amines or quarternary ammonium compounds dissolved in water-immiscible solvents. The loaded organic extractants are stripped, e.g. cobalt is stripped from the amine extractant at stage 40, with the regenerated amine extractant being recycled to stage 38. It will be appreciated by those skilled in the art that other processes and/or reagents can easily be employed for separating the metals from the concentrated metal chloride solution.

The purified nickel chloride solution is then hydrolyzed in a fluid bed reactor to form nickel oxide and hydrogen chloride at stage 42, as described hereinbefore.

An important feature of this embodiment is the recycling of the gaseous effluents to the various stages of the overall process. The gaseous effluent from hydrolysis stage 42 is passed through the stripped pregnant solution to concentrate the solution with respect to nickel and chloride ions prior to liquid organic extraction and then through water to recover the remainder of the gaseous hydrogen chloride to produce the hydrochloric acid for leaching the granulated sulfides. Hydrogen sulfide generated from hydrochloric acid leaching stage 32 and from stripping stage 34 is used to precipitate nickel and cobalt sulfides in stage 28. The gaseous effluents from stages 32 and 34 are advantageously passed through a solution of organic absorber, e.g. citric acid or monoethanolamine, at stage 44 to separate the hydrogen sulfide from the hydrogen, and the hydrogen sulfide is regenerated from the solution by conventional techniques for reuse. The separated hydrogen, after drying, is reacted with sulfur at 46 to form additional amounts of hydrogen sulfide for use in precipitating nickel and cobalt at stage 28. The sulfur containing gases generated at melting stage 30 are cycled through acid plant 48 to produce acid for leaching stage 20. Thus, except for unavoidable losses, the preferred embodiment provides a closed cycle for all of the reagents and only make-up amounts must be added at the various stages.

Figure 3:
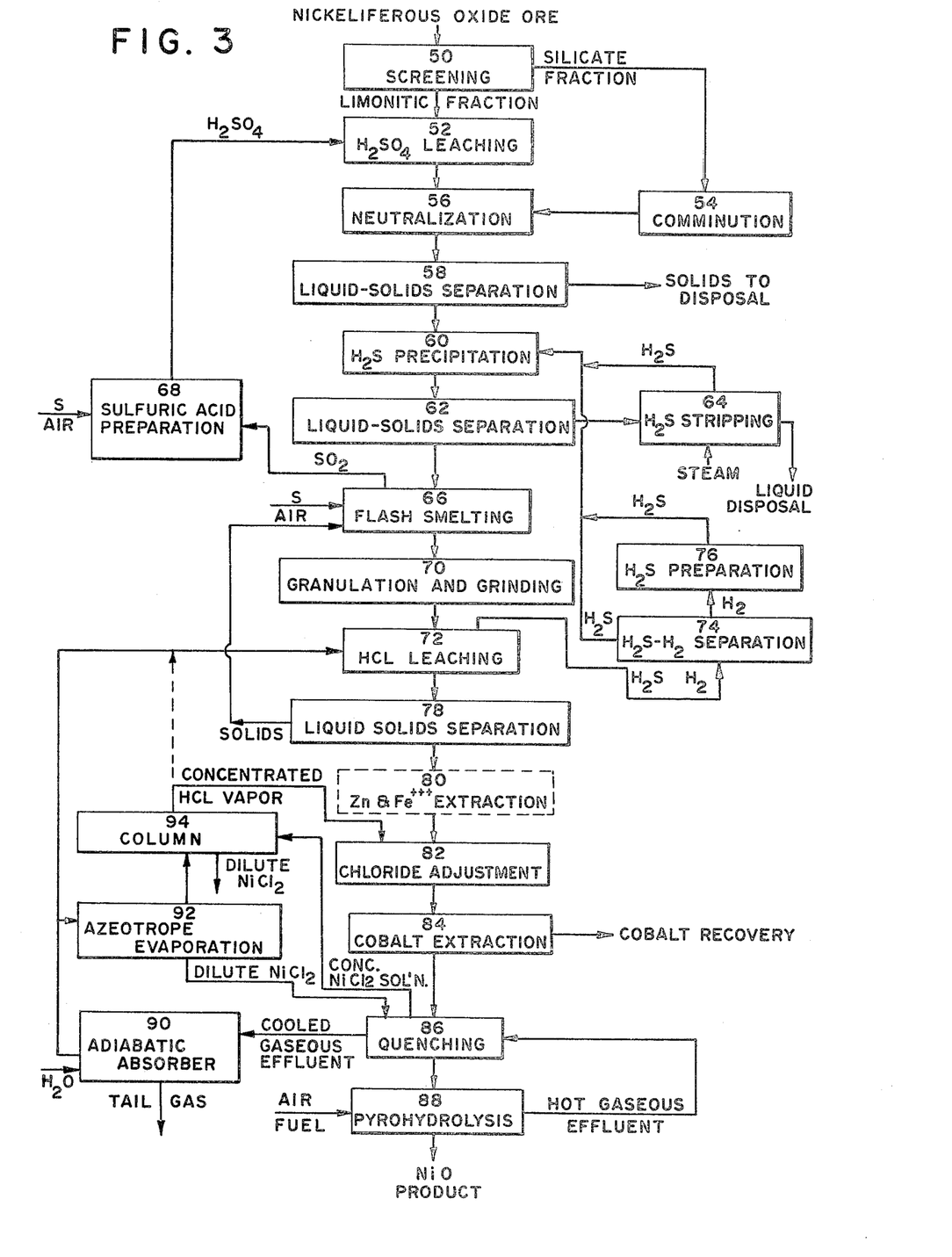
FIG. 3 discloses an advantageous flowsheet depicting the use of the process in accordance with the present invention.

Referring now to FIG. 3 which is a block flowdiagram of a preferred embodiment of the present invention, nickeliferous oxide ore having limonitic and silicate (high magnesia) fractions is pretreated by screening at stage 50. The fine limonitic fraction is pulped with water, preheated to a leaching temperature between about 260° C. and about 300° C. and fed to autoclave 52. Sulfuric acid in an amount between about 0.15 and 0.25 by weight of the dry ore is incrementally added to the autoclave to leach at least about 90% of the nickel contained in the ore and a like amount of any cobalt. The leaching operation is described in greater detail in U.S. Pat. No. 4,098,870 to Fekete et al. which is incorporated herein by reference. The silicate fraction is comminuted to a particle size of at least about 95% minus 65 mesh USS at 54. The leach pulp from autoclave 52 and the ground ore from 54 are fed to neutralization stage 56 to neutralize any free sulfuric acid in the leach liquor. The neutralized pulp is sent to liquid-solids separation 58 from which the solids are sent to disposal and the pregnant solution is sent to hydrogen sulfide precipitation 60. Nickel, cobalt and other metal values whose sulfides are insoluble in sulfate solutions having a pH value greater than about 1 are precipitated with gaseous hydrogen sulfide. Precipitation of the nickel and cobalt sulfides is conducted at ambient pressures and at temperatures of about 85° C. or more with substantial recirculation of the precipitated sulfides. The hydrogen sulfide precipitation process is described in greater detail in U.S. Pat. No. 4,110,400 to Jha et al, filed Aug. 1, 1977, which is incorporated herein by reference. The slurry from hydrogen sulfide precipitation 60 is fed to liquid-solids separation 62 where the liquid is separated and sent to hydrogen sulfide stripping 64. Steam is passed through the liquid from liquid-solids separation 62 to sparge hydrogen sulfide therefrom, which hydrogen sulfide is recycled to hydrogen sulfide precipitation 60 and the stripped liquid is sent to disposal.

The sulfide precipitate from liquid-solids separator 62 is dried and sent to flash smelter 66 where additional extraneous heat is generated by burning elemental sulfur and air. The flash smelting separating is conducted to provide a nickel matte having sulfur content between about 25% and about 27%. Sulfur dioxide generated during flash smelting is transferred to sulfuric acid plant 68 to produce sulfuric acid which is recycled to autoclave 52 for leaching additional amounts of nickeliferous oxide ore.

Molten nickel matte from flash smelter 66 is granulated in water and, if necessary, ground to a particle size of at least about 100% minus 100 mesh USS at 70. Granulated and ground matte from 70 is sent to hydrochloric acid leaching 72 where the ground matte is leached with hydrochloric acid having a hydrogen chloride concentration between about 3 N up to the azeotropic composition. Hydrochloric acid reacts with the nickel matte to form hydrogen sulfide and hydrogen which is conveyed to hydrogen sulfide separator 74. The separated hydrogen sulfide from separator 74 is recycled to hydrogen sulfide precipitation 60 and the hydrogen is sent to hydrogen sulfide preparation 76 from where the prepared hydrogen sulfide is sent to hydrogen sulfide precipitation 60.

The pulp from hydrochloric acid leaching 72 is sent to liquid-solids separation 78 from which the underflow is returned to 72 and the overflow is treated for nickel and cobalt recovery.

If the overflow from 78 contains significant amounts of zinc and iron these metals can be extracted at 80 from the chloride solution with an organic extractant comprising tributylphosphate dissolved in a suitable organic solvent. As shown in FIG. 3, this step is optional and will be used only if the nickel chloride solution contains significant amounts of zinc. The chloride raffinate from 80 is treated in chloride adjustment 82 with concentrated hydrogen chloride vapor to increase the chloride concentration of the solution to between about 8 N and about 10 N. The chloride solution from 82 is sent to a cobalt extraction 84 where cobalt and other metal values forming complex chloride anions are extracted with an organic extractant comprised of tributylphosphate dissolved in an organic solvent, preferably the organic extractant contains between about 30% and 50% tributylphosphate by weight.

The loaded organic extractant is treated for cobalt recovery with the stripped organic extractant being recycled to 84. The raffinate from 84 is conveyed to quench tower 86 where the raffinate is concentrated and heated to near its boiling point. A portion of the concentrated nickel chloride solution from 87 is fed to the pyrohydrolysis unit 88 which comprises a fuel-fired fluidized bed of nickel oxide granules. The concentrated nickel chloride solution fed to 88 is oxidized to nickel oxide and produces a hot gaseous effluent containing hydrogen chloride. The hot gaseous effluent from 88 is fed to quench tower 86 where nickel chloride solution is concentrated. The cooled gaseous effluent from 86 is sent to adiabatic absorber 90 where the hydrogen chloride contained in the cooled gaseous effluent is absorbed. A portion of the azeotrope from adiabatic absorber 90 is recycled to leaching stage 72 and another portion is sent to azeotrope evaporator 92. Azeotropic vapor from 92 is fed to column 94 where it reacts with a portion of the concentrated nickel chloride solution from 86 to produce a vapor concentrated in hydrogen chloride which can be recycled to chlorine adjustment stage 82 an if recycled to leaching stage 72, the concentrated nickel chloride solution from 86 picks up water from the azeotrope vapor in 92 in column 94 to produce a dilute nickel chloride solution from 86 to produce a vapor concentrated in hydrogen chloride which can be recycled to chlorine adjustment stage 82 and if recycled to leaching stage 72, the concentrated nickel chloride solution from 86 picks up water from the azeotrope vapor in 92 in in column 94 to produce a dilute nickel chloride solution which is fed through azeotrope evaporator 92 and then to quench 86.

It is evident from the description of the flowsheet in FIG. 3 that the process in accordance with the present invention provides a unique combination of steps in which various reagents such as sulfur, hydrogen sulfide and hydrogen chloride are recycled in such a manner as to minimize the amount of fresh reagents required in the overall process.

Figure 4:
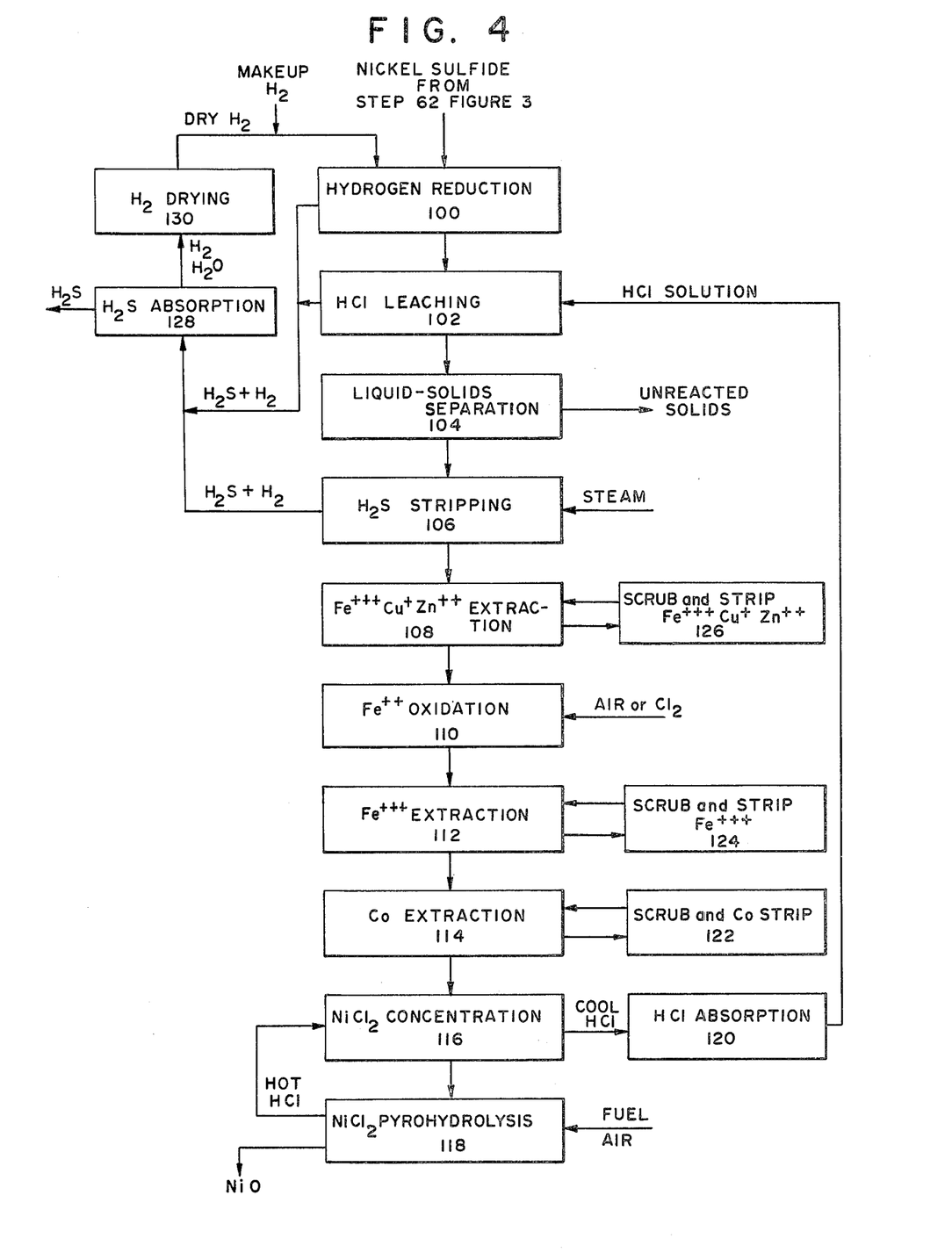
FIG. 4 is a particularly advantageous flowsheet incorporating the process in accordance with the present invention.

A particularly advantageous variation of the process in accordance with the present invention is depicted in FIG. 4. The sulfide precipitate from step 62 in FIG. 3 is reduced at 100 with hydrogen at a temperature between about 250° C. and about 700° C., advantageously between about 300° C. and about 600° C., to lower the sulfur content of the sulfide precipitate so that the reduced material corresponds roughly to $Ni_7S_6$. This reduction can be conducted in any reactor that provides good gas-solid contact, e.g., an indirectly-heated rotary kiln or a fluid bed reactor which is either indirectly-heated or employs gaseous hydrogen preheated to the reduction temperature. The off-gas from 100 containing hydrogen and hydrogen sulfide is sent to 128 which is an absorber containing monoethanolamine in which hydrogen sulfide is absorbed providing a gaseous effluent containing water vapor and hydrogen which gaseous effluent is dried at 130 and the resulting hydrogen is recycled to 100.

The reduced sulfide precipitate is fed to 102 where it is leached with a hydrochloric acid solution having a concentration between about 3 N and the azeotropic composition at a temperature between about 50° C. and about 110° C. to produce a pregnant nickel chloride solution containing between about 50 gpl and about 300 gpl nickel. Hydrochloric acid leaching produces a gaseous effluent containing hydrogen and hydrogen sulfide which is sent to 128 for hydrogen sulfide and hydrogen recovery. When leaching is completed the slurry is sent to 104 for liquid-solids separation where the unreacted solids are recovered for further treatment and the pregnant nickel chloride solution is recovered. The pregnant nickel chloride solution is sent to 106 where hydrogen sulfide is stripped from the nickel chloride solution by passing steam therethrough. The gaseous effluent from the stripping operation containing hydrogen sulfide, hydrogen and steam is sent to 128 to recover further amounts of hydrogen sulfide and hydrogen.

The stripped pregnant nickel chloride solution is sent to 108 where it is treated with a liquid organic extractant comprising between about 5% and about 35%, by weight, tributylphosphate and the balance essentially a non polar, water-immiscible organic solvent. Treatment with this tributylphosphate solution extracts ferric iron, zinc and copper producing a loaded organic extractant and a nickel chloride raffinate. The loaded organic extractant is sent to 126 where it is scrubbed with water to recover nickel chloride which is returned to 108 and, after scrubbing, is stripped with weak (about 4 N) hydrochloric acid solution to regenerate the extractant for recycling to 108. The nickel chloride raffinate is sent to 110 where ferrous iron is oxidized to the ferric state. Oxidation of ferrous iron to ferric iron is accomplished by sparging the nickel chloride raffinate with air, chlorine or mixtures thereof. The nickel chloride raffinate containing additional amounts of ferric iron is sent to 112 where it is treated with an organic extractant containing between about 5% and about 35% tributylphosphate dissolved in a water-insoluble, non polar, organic solvent which extracts ferric iron. This loaded organic extractant is sent to 124 where it is scrubbed with water which scrub solution contains nickel chloride and is sent to 112 and then is stripped with a weak hydrochloric acid solution to regenerate the extractant which is recycled to 112.

The raffinate from 112 is sent to 114 for cobalt extraction. The cobalt is extracted by contacting the nickel chloride solution with hydrogen chloride salt of an amine or a quarternary ammonium compound. The amine or quarternary ammonium compound is dissolved in a non polar, water-immiscible organic solvent in amounts between about 10% and about 20%. The organic extractant containing cobalt is sent to 122 where it is scrubbed with water to recover nickel chloride which is recycled to 114 and is then contacted with additional amounts of water to strip the cobalt therefrom and to regenerate the organic extractant for recycling to 114.

The purified nickel chloride solution from 114 is sent to 116 for concentration. The concentrated nickel chloride solution is then sent to 118 where the concentrated nickel chloride solution is hydrolyzed at elevated temperatures. Advantageously, the concentrated nickel chloride solution is fed to a fluidized bed of nickel oxide heated to a temperature above about 750° C., advantageously between about 800° C. and about 950° C. The fluidized bed is maintained at temperature by combusting a hydrocarbon fuel and air with the amounts of air and fuel being controlled to provide an atmosphere that is nonreducing to nickel oxide and nickel chloride and nonoxidizing to hydrogen chloride. High temperature hydrolysis produced a marketable nickel oxide product and a hot gaseous effluent containing hydrogen chloride and suspended nickel oxide. The hot gaseous effluent is passed through a cyclone separator to recover a preponderant part of the suspended nickel oxide and is then fed to 116 where the hot gaseous effluent is quenched with purified nickel chloride solution from 114. The cooled gaseous effluent from 116 is sent to absorption column 120 where hydrogen chloride contained in the cooled gaseous effluent is absorbed in water to produce a hydrochloric acid solution having a concentration between about 3 N and the azeotropic composition. The hydrochloric acid solution from 120 is recycled to 102 to leach additional amounts of reduced nickel sulfide.

For the purpose of giving those skilled in the art a better understanding of the invention, the following illustrative example is given:

EXAMPLE 1

A nickeliferous oxide ore containing 2.00% nickel, 0.08% cobalt, 32.4% iron and about 18.3% silica was leached with sulfuric acid at 270° C. under 56 atmospheres. The resulting slurry was neutralized with a high magnesia nickeliferous silicate ore. The dissolved nickel and cobalt values were precipitated as sulfides from the solution with hydrogen sulfide. Analysis of the precipitate showed that it contained 60% nickel, 2.4% cobalt and the remainder substantially sulfur and minor impurities such as zinc, copper and iron.

The sulfide precipitate was smelted in an electric arc furnace and the resulting melt was granulated in water and then ground to an average particle size of 50 microns. The ground material contained 67.0% nickel, 2.7% cobalt and 27% sulfur. The off-gases from the electric furnace were suitable for subsequent treatment to produce sulfuric acid.

The granulated matte was leached with 6 N hydrochloric acid at the boiling point to produce a pregnant solution containing 110 gpl nickel, 4.4 gpl cobalt, 2 gpl iron and 75 gpl free hydrochloric acid. Hydrogen and hydrogen sulfide generated during leaching were recovered for recycling to the earlier stages of the process. Hydrochloric acid leaching dissolved substantially all of the nickel contained in the granulated matte. Solids from liquid-solids separation were washed and recycled to the melting furnace.

Live steam was passed through the pregnant solution to strip it of any dissolved hydrogen or hydrogen sulfide, and the loaded stripping gas was combined with the gases generated during leaching for use in the earlier stages of the process. After being stripped the pregnant solution was concentrated with respect to nickel and chloride ions by evaporation using the off-gases from the high temperature hydrolysis unit. Evaporation increased the nickel content to 230 gpl, the cobalt content to 9.2 gpl, the iron content to 4.2 gpl and the chloride content to 360 gpl.

The concentrated solution was contacted with tributylphosphate dissolved in an aromatic diluent. An organic to aqueous ratio of 5:1 was used. This treatment lowered the cobalt content to 0.05 gpl and the iron content to 0.01 gpl. The raffinate substantially free of chloride-complex-forming impurities was ready to be treated for nickel recovery.

The nickel raffinate was fed to a fluidized bed of nickel oxide heated to 850° C. The fluidized bed was maintained at temperature by combusting light fuel oil with an excess of air so that the off-gas contained 1.0% free oxygen, i.e. the atmosphere within the fluidized bed was non-reducing to nickel chloride and nickel oxide. Nickel oxide was withdrawn from the bed at a rate that approximated the amount of nickel contained in the raffinate.

The off-gas from the fluid bed reactor was passed through a cyclone precipitator with the solids being returned to the fluid bed reactor and the cleaned gas was passed through the pregnant solution to evaporate the solution and to redissolve part of the hydrogen chloride contained in the gas. Any unreacted nickel chloride or unprecipitated nickel oxide contained in the cleaned off-gas were also recovered at this point. After passing through the pregnant solution the gas was then passed through a water absorber to recover the remaining hydrogen chloride for recycling to leaching.

Although the present invention has been described in conjunction with preferred embodiments, it is to be understood that modifications and variations may be resorted to without departing from the spirit and scope of the invention, as those skilled in the art will readily understand. For example, ion exchange resins can be employed to extract various impurities from nickel solutions, particularly when such impurities as zinc are present in small amounts. When zinc is present in small amounts, carboxylic resins can be used to extract the zinc from the nickel chloride solution. Another example is the use of activated carbon to extract small amounts of metallic impurities or gaseous impurities, such as hydrogen sulfide. Such modifications and variations are considered to be within the purview and scope of the invention and appended claims.

We claim:

1. A process for recovering nickel from a nickeliferous sulfidic material containing at least one other metal selected from the group consisting of cobalt, copper and iron which comprises leaching the sulfidic material with an at least about 3 N hydrochloric acid solution to provide a pregnant nickel chloride solution; contacting the pregnant nickel chloride solution with an organic extractant to extract the other metal and to provide a nickel chloride raffinate; concentrating the nickel chloride raffinate; feeding the concentrated nickel chloride raffinate to a high temperature hydrolysis unit wherein the concentrated nickel chloride raffinate is oxidized to a nickel oxide product and a hot gaseous effluent containing hydrogen chloride; recycling the hot gaseous effluent from the high temperature hydrolysis unit through the nickel chloride raffinate to concentrate the raffinate and to produce a cooled gaseous effluent containing hydrogen chloride; and passing the cooled gaseous effluent through a water absorber to generate hydrochloric acid for leaching fresh nickeliferous sulfidic material.

2. The process as described in claim 1 wherein the leach solution has a hydrochloric acid concentration of between about 3 N and 9 N.

3. The process as described in claim 2 wherein the leach solution has a hydrochloric acid concentration of between about 3 N and the azeotropic composition.

4. The process as described in claim 3 wherein the leach solution has a hydrochloric acid concentration of between about 4 N and about 6 N.

5. The process as described in claim 4 wherein the nickeliferous sulfidic material is leached at a temperature between about 50° C. and about 100° C.

6. The process as described in claim 1 wherein the nickeliferous sulfidic material is a sulfide precipitate obtained by precipitating nickel from acidic leach solutions.

7. The process as described in claim 6 wherein the nickel sulfide precipitate is thermally activated to increase both the rate and extent of nickel leaching.

8. The process as described in claim 7 wherein the nickeliferous sulfide precipitate is smelted to provide a nickeliferous sulfidic material having a composition approaching $Ni_3S_2$.

9. The process as described in claim 7 wherein the nickeliferous sulfide precipitate is activated by heating the nickeliferous sulfide precipitate to a temperature between about 250° C. and about 700° C. in a hydrogen containing atmosphere whereby the hydrogen reacts with sulfur contained in the nickeliferous sulfide precipitate to produce hydrogen sulfide and a nickeliferous sulfidic material having a sulfur content less than that required to satisfy the stoichiometry of all the metals present in the nickeliferous sulfide precipitate.

10. The process as described in claim 1 wherein the high temperature hydrolysis unit is a fluidized bed of nickel oxide particles heated to a temperature of at least about 750° C.

11. The process as described in claim 10 wherein the fluidized bed is maintained at a temperature of at least about 750° C. by combusting a hydrocarbon fuel and air in the fluidized bed with the composition being controlled such that the products of combustion are nonreducing to nickel oxide and nickel chloride and nonoxidizing to hydrogen chloride.

12. The process as described in claim 11 wherein the combustion is controlled so that the off gas from the fluidized bed has a free oxygen content of less than about 2%, by volume.

13. The process as described in claim 10 wherein the temperature of the fluidized bed is maintained between about 800° C. and about 950° C.

14. The process as described in claim 1 wherein the liquid organic extractant is tributylphosphate dissolved in a water-immiscible organic solvent with the tributyl phosphate being present in the organic solvent in amounts between about 15% and 70%, be weight.

15. The process as described in claim 1 wherein the pregnant nickel chloride solution is first contacted with a liquid organic extractant containing tributylphosphate dissolved in a water-immiscible organic solvent to extract any ferric iron and then the pregnant nickel chloride solution is contacted with a second liquid organic extractant containing a water-insoluble amine or a quarternary ammonium compound dissolved in a water-immiscible organic extractant to extract cobalt and copper from the pregnant nickel chloride solution.

16. The process as described in claim 1 wherein the nickeliferous sulfidic material also contains zinc and the pregnant nickel chloride solution is first contacted with a liquid organic extractant containing tributylphosphate dissolved in a water-immiscible solvent to extract any ferric iron and zinc and then the nickel chloride solution is contacted with a second liquid organic extractant containing a water-immiscible compound dissolved in a water-immiscible organic solvent to extract cobalt from the pregnant nickel chloride solution.

17. The process for recovering nickel and cobalt from nickeliferous oxide ores which comprises leaching the oxide ore with sulfuric acid at a temperature between about 230° C. and about 300° C. in an autoclave to produce a pregnant sulfate solution containing nickel and cobalt; treating the pregnant sulfate solution with hydrogen sulfide to precipitate the nickel and cobalt values as sulfides; leaching the sulfide precipitate with a hydrochloric acid solution having an acid concentration of at least about 3 N to product a pregnant nickel chloride solution and hydrogen sulfide; recycling the hydrogen sulfide to the sulfide precipitation step; contacting the pregnant nickel chloride solution with a liquid organic extractant to extract the other metal and to provide a nickel chloride raffinate; concentrating the nickel chloride raffinate; feeding the concentrated nickel chloride raffinate to a high temperature hydrolysis unit wherein the concentrated nickel chloride raffinate is oxidized to a nickel oxide product and a hot gaseous effluent containing hydrogen chloride is produced; recycling the hot gaseous effluent from the high temperature hydrolysis unit through the nickel chloride raffinate to concentrate and to produce a cooled gaseous effluent containing hydrogen chloride; and passing the cooled gaseous effluent through a water absorber to generate hydrochloric acid for leaching fresh nickeliferous sulfidic material.

18. The process as described in claim 17 wherein the leach solution has a hydrochloric acid concentration of between about 3 N and 9 N.

19. The process as described in claim 18 wherein the leach solution has a hydrochloric acid concentration of between about 3 N and the azeotropic composition.

20. The process as described in claim 19 wherein leach solution has a hydrochloric acid concentration of between about 4 N and about 6 N.

21. A process for separately recovering nickel and cobalt from a sulfidic material which comprises leaching the sulfidic material with an aqueous solution of hydrochloric acid having a concentration at least about 3 N to dissolve substantially all of the sulfidic material and to produce a pregnant nickel chloride solution, increasing the nickel and the chloride concentrations of the pregnant nickel chloride solution by evaporation and by adding hydrogen chloride thereto to form anionic chloride cobalt complexes, contacting the concentrated nickel chloride solution having the anionic cobalt chloride complexes with an organic extractant to extract the anionic cobalt chloride complexes and to produce a nickel chloride raffinate, hydrolyzing the nickel chloride raffinate at a temperature above about 750° C. to produce a refined nickel oxide product and a hot gaseous effluent containing hydrogen chloride which is first passed through the pregnant nickel chloride solution to increase the nickel and chloride concentrations thereof and to form anionic cobalt chloride complexes and then through water to form a hydrochloric acid solution which is recycled for leaching additional amounts of the nickeliferous sulfidic material.

22. The process as described in claim 21 wherein leaching is conducted at a temperature between about 50° C. and about 110° C.

23. The process as described in claim 21 wherein the organic extractant is at least one member selected from the group consisting of water-insoluble amines, quarternary ammonium compounds and organic-phosphorus compounds dissolved in a water-immiscible solvent.

24. The process as described in claim 21 wherein the hydrolysis is conducted in fluid bed reactor maintained at a temperature between about 800° C. and about 950° C.

25. The process as described in claim 24 wherein the off-gas from the fluid bed reactor contains free oxygen in an amount less than about 1% by volume.

26. A process for recovering nickel and cobalt from nickeliferous oxide ores which comprises leaching the oxide ores with sulfuric acid at a temperature between about 230° C. and about 300° C. in an autoclave to produce a pregnant sulfate solution containing the nickel and cobalt values; treating the pregnant sulfate solution with hydrogen sulfide to precipitate the nickel and cobalt values as sulfides, leaching the sulfide precipitate with up to 6 normal hydrochloric acid to produce a pregnant nickel chloride solution, increasing the nickel and the chloride concentrations of the pregnant nickel chloride solution by evaporation and by adding hydrogen chloride thereto to form anionic chloride cobalt complexes, contacting the concentrated nickel chloride cobalt complexes, contacting the concentrated nickel chloride solution having the anionic cobalt chloride complexes with a liquid organic extractant to extract the anionic cobalt chloride complexes and to produce a nickel chloride raffinate, hydrolyzing the nickel chloride raffinate at a temperature above about 750° C. to produce a refined nickel oxide product and a hot gaseous effluent containing hydrogen chloride which is first passed through the pregnant nickel chloride solution to increase the nickel and chloride concentrations thereof and to form anionic cobalt chloride complexes and then through water to form a hydrochloric acid solution which is recycled for leaching additional amounts of the nickeliferous sulfidic material.

27. The process as described in claim 26 wherein leaching with hydrochloric acid is conducted at a temperature between about 50° C. and about 110° C.

28. The process as described in claim 26 wherein the organic extractant is at least one member selected from the group consisting of water-insoluble amines, quarternary ammonium compounds and organic-phosphorus compounds dissolved in a water-immiscible solvent.

29. The process as described in claim 26 wherein the hydrolysis is conducted in fluid bed reactor maintained at a temperature between about 800° C. and about 950° C.

30. The process as described in claim 29 wherein the offgas from the fluid bed reactor contains free oxygen in an amount less than about 1%, by volume.

31. The process as described in claim 26 wherein hydrogen and hydrogen sulfide generated during leaching with hydrochloric acid are recovered for recycling to the sulfide precipitation stage.

32. The process as described in claim 26 wherein the pregnant nickel chloride solution is stripped of dissolved hydrogen and hydrogen sulfide which are combined with the hydrogen and hydrogen sulfide recovered during leaching.

33. The process as described in claim 32 wherein the hydrogen sulfide in the combined stream is separated from the hydrogen by an organic absorber and the hydrogen is reacted with elemental sulfur to generate hydrogen sulfide for the sulfide precipitation step.

34. The process as described in claim 26 wherein the sulfide precipitate is melted to a matte in an electric arc furnace to adjust the sulfur content of the precipitate to less than about 30% and the matte is granulated or ground for leaching with hydrochloric acid.

35. The process as described in claim 34 wherein the sulfur-containing gases generated in the electric arc furnace are recovered and converted to sulfuric acid for use in leaching the nickeliferous oxide ore.

36. A process for recovering nickel from a nickelcopper matte which comprises leaching the nickel copper matte with at least about 3 N hydrochloric solution to provide a pregnant nickel chloride solution and a copper sulfide residue; separating the copper sulfide residue from the pregnant nickel chloride solution for subsequent treatment to recover copper; contacting the pregnant nickel chloride solution with a recycled organic extractant to extract any copper remaining in the nickel chloride solution and to provide a nickel chloride raffinate; concentrating the nickel chloride raffinate; feeding the concentrated nickel chloride raffinate to a high temperature hydrolysis unit wherein the concentrated nickel chloride raffinate is oxidized to a nickel oxide product and a hot gaseous effluent containing hydrogen chloride; recycling the hot gaseous effluent from the high temperature hydrolysis unit through the nickel chloride raffinate to concentrate the raffinate and to produce a cooled gaseous effluent containing hydrogen chloride; and passing the cooled gaseous effluent through a water absorber to generate hydrochloric acid for leaching fresh nickel copper matte.

* * * * *